United States Patent [19]
Hiramatsu et al.

[11] Patent Number: 4,719,998
[45] Date of Patent: Jan. 19, 1988

[54] POWER TRANSMISSION SYSTEM FOR VEHICLE

[75] Inventors: Takeo Hiramatsu, Nagaokakyo; Bonnosuke Takamiya, Joyo; Yoshimasa Nagayoshi, Kyoto, all of Japan

[73] Assignee: Mitsubishi Jidosha Kogyo Kabushiki Kaisha, Tokyo, Japan

[21] Appl. No.: 738,698

[22] Filed: May 28, 1985

[30] Foreign Application Priority Data

| May 29, 1984 [JP] | Japan | 59-109221 |
| Oct. 24, 1984 [JP] | Japan | 59-223582 |
| Oct. 24, 1984 [JP] | Japan | 59-223583 |

[51] Int. Cl.⁴ ............ F16D 25/02; B60K 41/02; B60K 17/34
[52] U.S. Cl. .................. 192/0.033; 192/103 F; 180/233
[58] Field of Search .......... 192/0.033, 103 F, 85 AA; 74/710.5, 711; 180/248, 249, 233, 242

[56] References Cited

U.S. PATENT DOCUMENTS

| 2,153,372 | 4/1939 | Hyde | 192/85 AA |
| 2,670,828 | 3/1954 | McFarland | 192/85 AA |
| 3,040,600 | 6/1962 | Mueller | 74/711 |
| 3,724,289 | 4/1973 | Kennicutt | 74/711 |
| 3,748,928 | 7/1973 | Shiber | 74/711 |
| 3,752,280 | 8/1973 | Cheek | 192/103 F X |
| 3,894,446 | 7/1975 | Snoy et al. | 192/103 F X |
| 3,974,900 | 8/1976 | Park | 192/103 F X |
| 4,012,968 | 3/1977 | Kelbel | 192/85 AA X |
| 4,305,313 | 12/1981 | Konkle | 74/711 |
| 4,445,400 | 5/1984 | Sullivan et al. | 192/85 AA X |
| 4,541,503 | 9/1985 | Akutagawa et al. | 180/249 |

FOREIGN PATENT DOCUMENTS

| 3145117 | 5/1983 | Fed. Rep. of Germany | 180/249 |
| 1093488 | 5/1955 | France | 192/85 AA |
| 26636 | 2/1983 | Japan | 180/233 |
| 1411283 | 10/1975 | United Kingdom | . |
| 2038429 | 7/1980 | United Kingdom | 74/711 |

Primary Examiner—Rodney H. Bonck
Assistant Examiner—David A. Testardi
Attorney, Agent, or Firm—Bruce L. Adams; Van C. Wilks

[57] ABSTRACT

The present invention relates to a power transmission system for a vehicle of the type in which front and rear wheels are driven by a sole engine. In order to control the distribution of drive torque produced by the engine to front wheel side and rear wheel side of the vehicle according to a difference in rotational speed between both sides and in relative rotational direction between both sides, the power transmission system includes an oil pump adapted to be driven by a first rotational shaft which transmits a driving torque from an engine to front wheels of the vehicle and a second rotational shaft which transmits the driving force to rear wheels of the vehicle. The oil pump produces an oil pressure proportional to the difference in rotational speed and has at least two ports. A clutch mechanism couples the rotational shafts with each other by the discharge pressure of the oil pump, and the clutch mechanism is disposed between the rotational shafts. An oil pressure control system controls the discharge pressure fed from the oil pump to the clutch mechanism to adjust the coupling force of the clutch mechanism in accordance with the difference in the relative rotational direction between the pair of rotational shafts.

24 Claims, 16 Drawing Figures

POWER TRANSMISSION SYSTEM FOR VEHICLE

BACKGROUND OF THE INVENTION

The present invention relates to a power transmission system for a vehicle of the type in which front and rear wheels are driven by the same engine.

Heretofore, various front drive base (FF base) vehicles have been developed in which a driving connection to rear wheels can be attained by coupling of a hydraulic clutch. And for operating the clutch, an oil pump is provided separately (e.g. a motor-driven oil pump or an oil pump for an automatic transmission), and the discharge pressure of the oil pump is adjusted suitably and then fed to the clutch to control the transmission of driving force to the rear wheels.

In such conventional power transmission system for vehicle, however, it is necessary to provide an oil pump separately, and therefore the means for adjusting the discharge pressure of the oil pump becomes complicated in structure.

SUMMARY OF THE INVENTION

The present invention has been accomplished in order to solve the above-mentioned problems. It is an object thereof to provide a vehicular power transmission system of a simple and compact construction capable of adjusting the discharge pressure of an oil pump automatically.

In order to achieve the above object, a power transmission system for vehicle of the present invention is characterized by an oil pump adapted to be driven by a difference in rotational speed between a first rotational shaft which transmits a driving force from an engine to front wheels of a vehicle and a second rotational shaft which transmits the driving force to rear wheels of the vehicle, and adapted to discharge an oil pressure according to the difference in rotational speed, the oil pump having at least two ports, a clutch mechanism for coupling the rotational shafts with each other by the pressure discharged from the oil pump, the clutch mechanism being disposed between the first and second rotational shafts, and an oil pressure control means for controlling the discharge pressure fed from the oil pump to the clutch mechanism to adjust the coupling force of the clutch mechanism.

Since the power transmission system for vehicle in the present invention has the above construction, upon occurrence of a difference in rotational speed between the first and second rotational shafts, a pressure according to the difference in rotational speed is discharged from the oil pump and fed to the clutch mechanism, which is turn operates to couple the first and second rotational shafts. Further, the oil pressure fed to the clutch mechanism is controlled by the oil pressure control means to thereby adjust the degree of coupling of the first and second rotational shafts, whereby the distribution of power to the front wheel side and the rear wheel side is controlled. As a further advantage, the entire system can be constructed compactly because the oil pump and the clutch mechanism are disposed adjacently to each other.

BRIEF DESCRIPTION OF THE DRAWINGS

FIGS. 1 to 6 illustrate a power transmission system for a vehicle according to a first embodiment of the present invention, in which:

FIG. 1 is a schematic construction diagram showing a power system of a vehicle equipped with the power transmission system;

FIG. 2 is a longitudinal sectional view of a principal portion thereof;

FIG. 3 is a hydraulic circuit diagram for an oil pump used therein;

FIG. 4 is a longitudinal sectional view of a relief valve 123 used therein and its vicinity;

FIG. 5 is a schematic illustration showing a principal portion of the oil pump; and FIG. 6 is a graph illustrative of the operation of the oil pump;

DETAILED DESCRIPTION OF THE PREFERRED EMBODIMENTS

Embodiments of the present invention will be described in detail hereinunder with reference to the drawings.

Referring first to FIGS. 1 to 6, there is illustrated a power transmission system according to a first embodiment of the present invention for enabling a vehicle to change a two-wheel drive to a four-wheel drive in which front and rear wheels can be driven by a sole engine.

Figure 1:
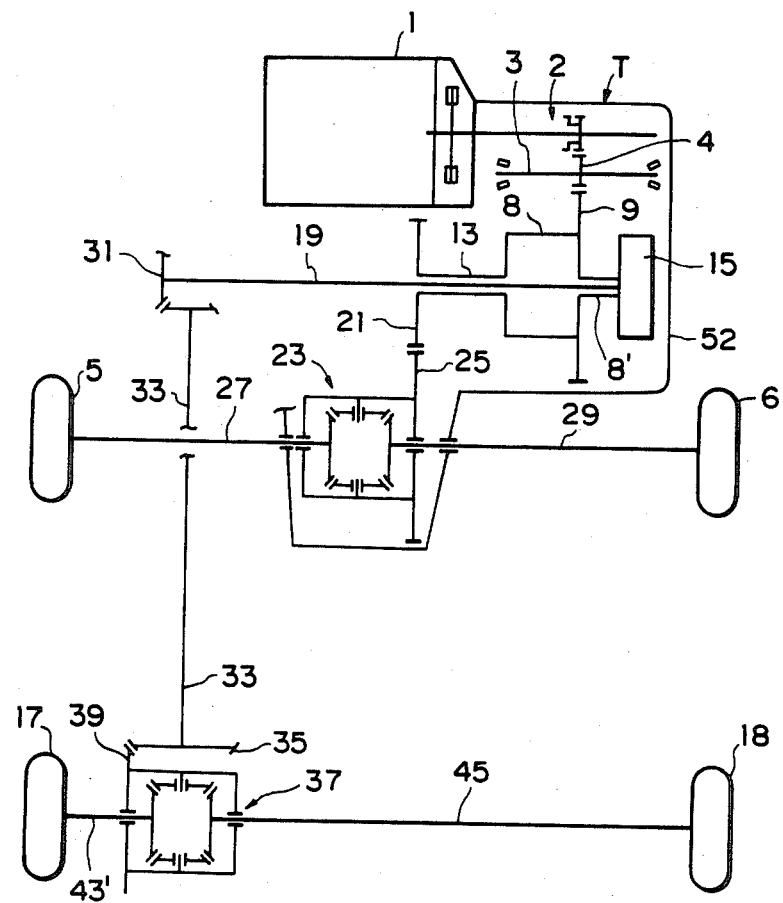

As shown in FIG. 1, an engine 1 is provided horizontally with a crankshaft extending in a transverse direction of a vehicle, and a transmission 2 which constitutes a power transmission system T is connected to the engine 1. The transmission 2 has an output shaft 3 extending in the vehicular transverse direction. To the output shaft 3 is fixed a drive gear (or a four-speed counter gear) 4 which is in mesh with a gear 9. The gear 9 is integral with sleeve or cylindrical shafts 8 and 8' as constituents of a first rotational shaft or front drive shaft. The sleeve shafts 8 and 8' are interconnected with each other by bolts 11. A front wheel driving shaft 13 (hereinafter referred to as the "front wheel output shaft 13") is splined to the sleeve shafts 8 and 8' with gear 9. The front wheel output shaft 13 and the sleeve shafts 8 and 8' constitute the first rotational or front drive shaft. By such a construction, the power from the power transmission system T is directly transferred only to the first rotational shaft.

Further, a power transmission system 15 is disposed between the sleeve shafts 8, 8' as constituents of the first rotational shaft and a rear wheel driving shaft 19 (hereinafter referred to as the "rear wheel output shaft 19") which constitutes a second rotational shaft or rear drive shaft for transmitting a driving force or torque to rear wheels 17 and 18.

On the front wheel output shaft 13 is mounted a gear 21 which is in mesh with a ring gear 25 of a front wheel differential mechanism 23 (hereinafter referred to as the "front wheel differential 23"), whereby drive torque from the front wheel output shaft 13 is divided by the front wheel differential 23 and thereafter transmitted to left and right front wheel driving shafts 27 and 29 to rotate front wheels 5 and 6.

The rear wheel output shaft 19 is connected to a propeller shaft 33 through a bevel gear mechanism 31, and a bevel gear 35 attached to the rear portion of the propeller shaft 33 is in mesh with a ring gear 39 of a rear wheel differential mechanism 37 (hereinafter referred to as drive "rear wheel differential 37"), whereby the drive torque from the rear wheel output shaft 19 is divided by the rear wheel differential 37 and thereafter transmitted to left and right rear wheel driving shafts 43 and 45 to rotate rear wheels 17 and 18.

The power transmission system 15 has a gear type oil pump 50 adapted to operate according to a difference of rotational speed between the sleeve shafts 8, 8' as well as the front wheel output shaft 13 and the rear wheel output shaft 19, and to discharge oil or fluid pressurized according to the difference of the rotational speed, and the power transmission system 15 has a clutch mechanism 53 adapted to receive the oil or fluid discharged from the oil pump 50 through a hydraulic circuit 51 and thereby adjust the degree of coupling or coupling force between the front wheel output shaft 13 side and the rear wheel output shaft 19 side so as to reduce the above difference of the rotational speed. Further, an oil or fluid pressure control means 55 is attached to the hydraulic circuit 51.

The following description is now directed to the structure and arrangement of the oil pump or pump means 50 and clutch mechanism or clutch means 53.

Figure 2:
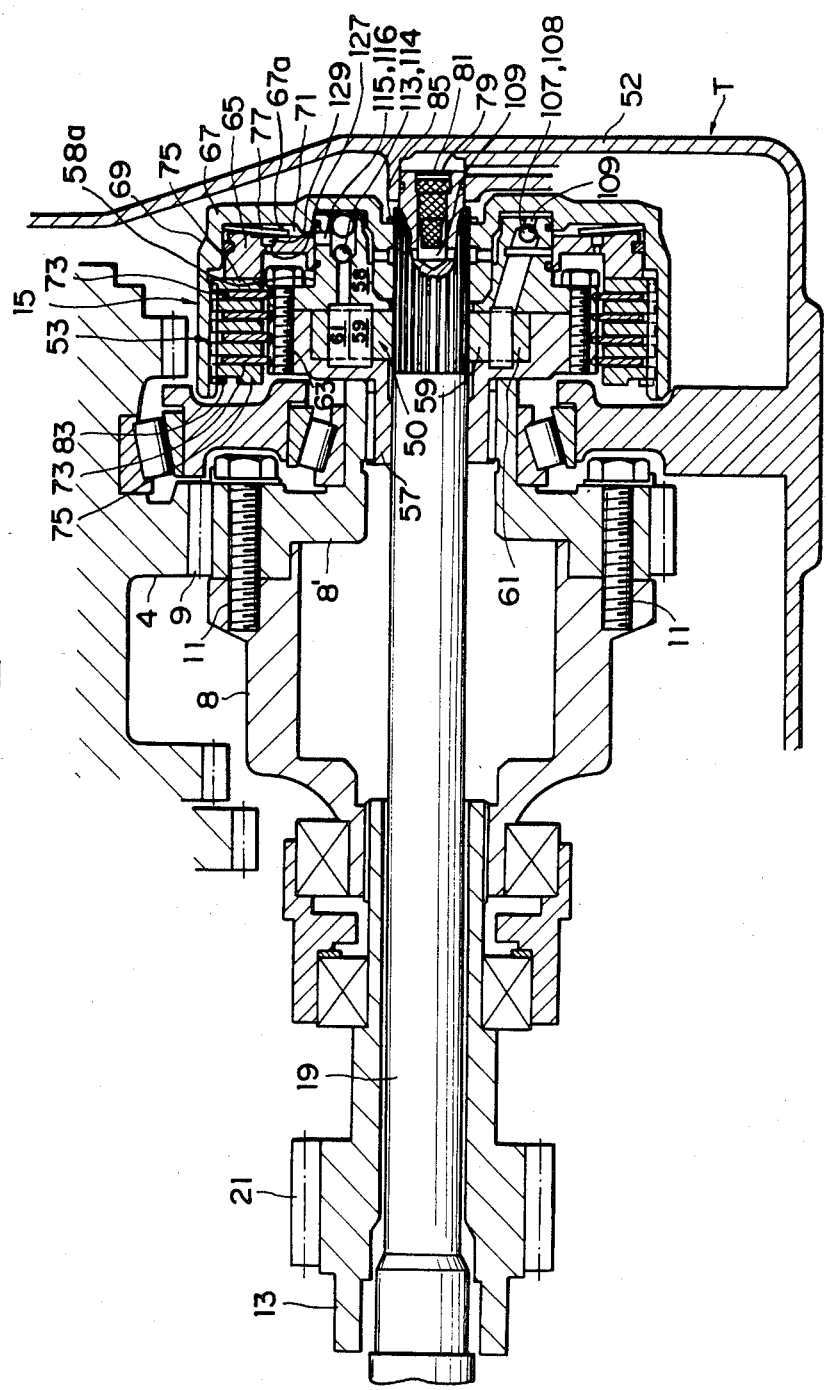

As shown in FIG. 2, the oil pump 50 and the clutch mechanism 53 are integrally mounted within a transmission case 52 with the transmission 2 disposed therein. A pump case 57 is splined to the sleeve shaft 8', and the clutch mechanism 53 is mounted on the outer peripheral portion of the pump case 57, while the oil pump 50 is mounted on the inner peripheral portion of the pump case 57.

As the oil pump 50 there is used, for example, a crescent-free internal gear pump (rotor pump). The oil pump 50 has an inner gear 59 as an external gear (pinion) splined to the rear wheel output shaft 19, and an outer gear 61 as an internal gear which is in mesh with the inner gear 59 but which is disposed in a position eccentric with respect to the inner gear 59. The inner gear 59 and outer gear 61 are formed so that their teeth are in the form of a hypocycloid curve. Both gears are mounted in pump cases 57 and 58. The pump case 58 is fixed to the pump case 57 with bolts 63, and a pump body is formed by the pump cases 57 and 58.

On the outer periphery of the pump case 58 is formed an annular stepped portion 58a in which is disposed an annular piston 65 as a constituent of the clutch mechanism 53, as shown in FIG. 2, whereby an oil chamber 71 is formed between the piston 65 and a cylinder 67 (pump case 58 and sleeve 69).

The clutch mechanism 53 has a plurality (four in this embodiment) of annular clutch plates 73 which are splined to the outer peripheries of the pump cases 57 and 58 as a clutch hub, and a plurality of pressure plates 75 which are splined to the inner periphery of the sleeve 69 engaged with the rear wheel output shaft 19. The clutch plates 73 and the pressure plates 75 are arranged alternately with each other and constitute frictional engaging elements.

In the oil chamber 71 of the clutch mechanism 53 is disposed an annular spring 77 as a biasing means in a position between an inner wall 67a of the cylinder 67 and the piston 65, whereby a pressing force (initial limiting torque) is imparted to the piston 65 to normally press the pressure plate 75.

The numeral 79 denotes a filter mounted in an oil suction port 81 formed at an end portion of the rear wheel output shaft 19; the numeral 83 denotes a stopper member for the clutch plates 73 and pressure plates 75; and the numeral 85 denotes a stopper member for the cylinder 67.

Figure 3:
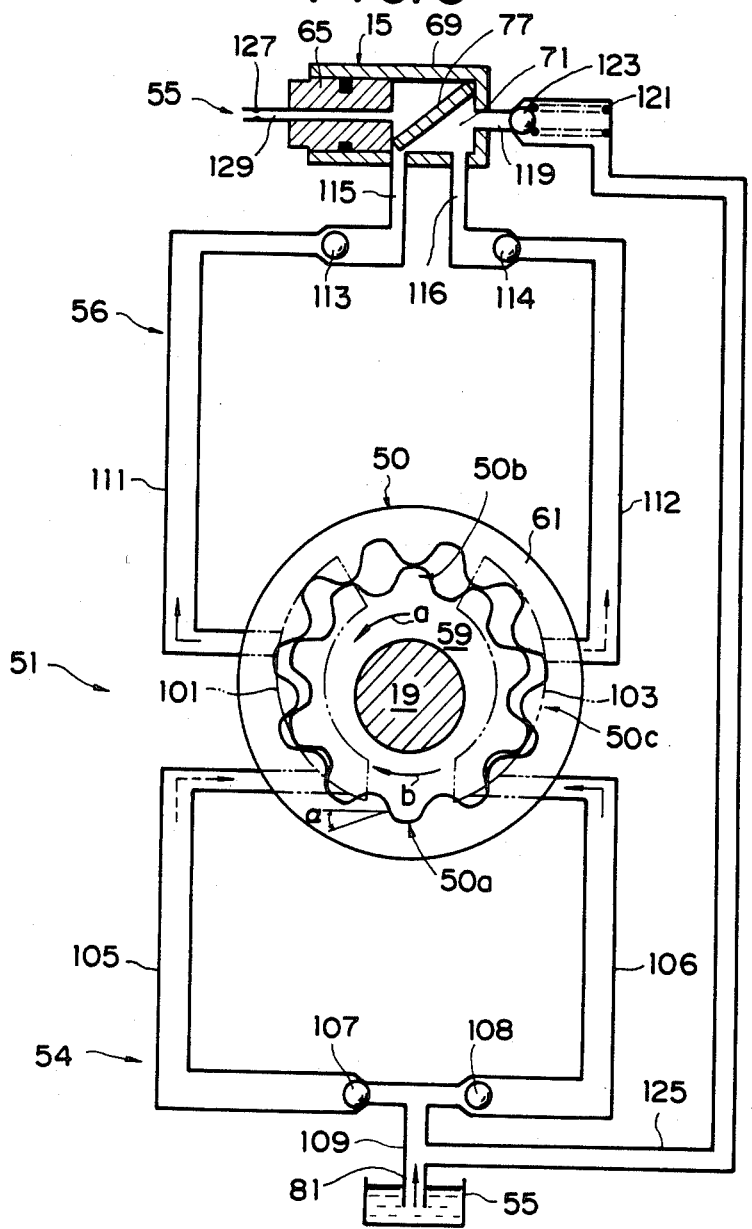

The hydraulic circuit 51 will now be explained in accordance with FIG. 3. The hydraulic circuit 51 comprises a first hydraulic circuit 54 which provides communication between the transmission case 52 constituting an oil sump and the oil pump 50, and a second hydraulic circuit 56 which provides communication between the oil pump 50 and the clutch mechanism 53. The oil pump 50 is formed with two ports 101 and 103 as shown in FIG. 3. One port or a first port 101 communicates with the oil suction port 81 which opens in an end of the rear wheel output shaft 19, through an oil passage 105 as a first oil passage, a check valve 107 as a first suction check valve and a suction oil passage 109, and the port 101 also communicates with a discharge oil passage 115 through an oil passage 111 as a third oil passage and a check valve 113 as a first discharge check valve. The other port or second port 103 communicates with the oil suction port 81 through an oil passage 106 as a second oil passage, a check valve 108 as a second suction check valve and the suction oil passage 109, and the port 103 also communicates with a discharge oil passage 116 through an oil passage 112 as a fourth oil passage and a check valve 114 as a second discharge check valve.

Figure 4:
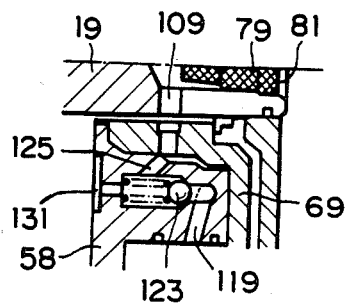
Figure 5:
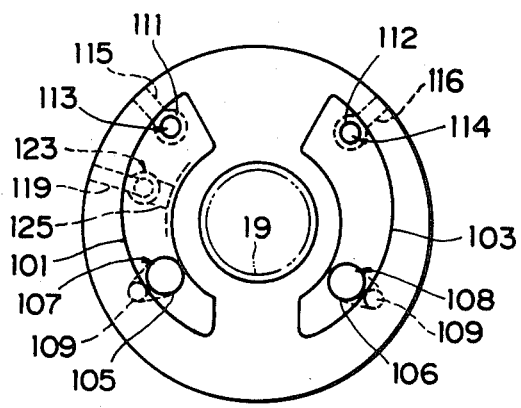

Further, an oil passage 125 with a relief valve 123 having a certain release pressure or limit pressure set by a spring 121 is formed between the oil passage 109 and an oil passage 119 which communicates with the oil chamber 71 of the clutch mechanism 53. The oil passages 105, 106 and 109 constitute the first hydraulic circuit 54, while the oil passages 111, 112, 115 and 116 constitute the second hydraulic circuit 56. Further, from the oil chamber 71 there branches an oil passage 129 with open to atmosphere through an orifice 127 as a restriction means formed in the piston 65 of the clutch mechanism 53. The oil passage 129 is lead to the clutch plates 73 and pressure plates 75, and the oil is discharged from the oil passage 129 to these clutch plates and pressure plates. The relief valve 123 and the orifice 127 constitute the oil pressure control means 55. The numeral 131, as shown in FIG. 4, denotes a plug for holding the relief valve 123 in the pump case 58, the plug 131 being in inserted into the pump case 58.

The ports 101, 103, oil passages 105, 106, 109, 111, 112, 115, 116, 119, relief valve 123 and check valves 107, 108, 113 and 114 are formed in the interior of the pump case 58.

The vehicular power transmission system of the first embodiment constructed as above operates in the following manner.

When the relative shaft rotation inner gear 59 rotates in the direction of arrow "a" upon occurrence of a difference in rotational speed between the front wheel output shaft 13 side and the rear wheel output shaft 19 side, oil is sucked into the port 103 through the oil suction port 81, oil passage 109, check valve 108 and oil passage 106 and thereafter discharged from the oil passage 115 through the port 101, oil passage 111 and check valve 113. At this time, there is obtained such a discharge pressure characteristic as indicated by mark A in FIG. 6.

Figure 6:
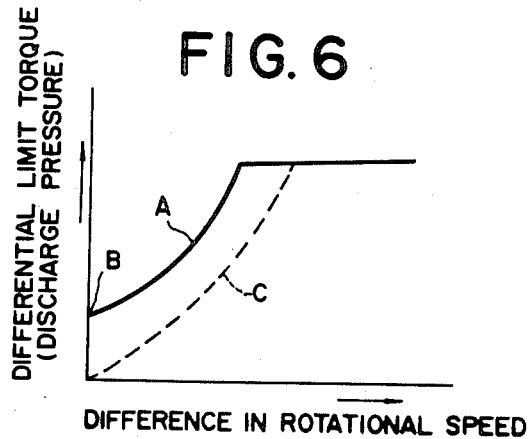

Conversely, when the inner gear 59 rotates in the relative shaft rotation direction of arrow "b", oil is sucked into the port 101 through the oil suction port 81, oil passage 109, check valve 107 and oil passage 105 and thereafter discharged from the oil passage 116 through the port 103, oil passage 112 and check valve 114. Also at this time, the same discharge pressure characteristic indicated by mark A in FIG. 6 is obtained.

With regard to the characteristic A, the reason why the discharge pressure scarcely rises once the difference in the rotation speed exceeds a certain value is that the relief valve 123 opens when a discharge pressure or variable fluid pressure reaches a predetermined limit pressure valve of the relief valve 123. The characteristic portion before opening of the relief valve 123 is proportional to the square of the difference in the rotational speed under the action of the orifice 127. Since the opening characteristics or limit pressure valve of the relief valve 123 and the throttling degree or capacity of the orifice 127 are set appropriately, the characteristics A can be adjusted to a desired characteristic.

When the oil or fluid pressure having such appropriately set discharge characteristics is fed to the oil chamber 71 and the piston 65 is thereby pushed out, the clutch plates 73 and the pressure plates 75 are brought into frictional contact with each other, thus causing engagement between the pump case 57 and the sleeve 69, namely, between the front wheel output shaft 13 side and the rear wheel output shaft 19 side. At this time, since the discharge pressure characteristic of the oil pump 50 are preset, the coupling force for urging the piston 65 varies in proportion to the magnitude of the discharge pressure, so that the degree of engagement of the clutch mechanism 53, namely, the degree of torque transmission, also varies in proportion thereto.

On the front wheel output shaft 13 is mounted the gear 21 as shown in FIG. 1, which is in mesh with the ring gear 25 of the front wheel differential 23, whereby the torque from the front wheel output shaft 13 is divided by the front wheel differential 23 and transmitted to the left and right front wheel shafts 27 and 29 to rotate the front wheels 5 and 6.

On the other hand, the rear wheel output shaft 19 is connected to the propeller shaft 33 through the bevel gear 31, and the bevel gear 35 on the propeller shaft 33 is in mesh with the ring gear 39 of the rear wheel differential 37, whereby the torque from the rear wheel output shaft 19 is divided by the rear wheel differential 37 and transmitted to the left and right rear wheel shafts 43 and 45 to rotate the rear wheels 17 and 18.

Therefore, in a normal straight running condition, the front wheels 5, 6 and the rear wheels 17, 18 have the same effective radius of tire and the slipping rotational speed of tire is low, so there does not occur a difference in rotational speed between the front wheel output shaft 13 side and the rear wheel output shaft 19 side. consequently, no oil or fluid pressure is generated from the oil pump 50, and the clutch mechanism 53 operates only with a pressing force of the annular spring 77, transmitting only the initial limiting torque. In this connection, in the case where the rotational speed of the front wheel output shaft 13 becomes higher than that of the rear wheel output shaft 19 during vehicular running at front wheel drive, for example, in the case where the rear wheels become nearly locked by braking, or the front wheels slip on a snow-covered road, or the front wheels race by sudden acceleration, the inner gear 59 rotates in the direction of arrow "a". Namely, the inner gear 59 rotates in the direction of arrow "a" relative to the outer gear 61 when the front wheel output shaft 13 rotates faster than the rear wheel output shaft 19. At this time, as previously noted, the circulating oil stored in the transmission case 52 is sucked into the second port 103 through the oil suction port 81, oil passage 109, check valve 108 and oil passage 106 and then discharged from the oil passage 115 into the oil chamber 71 through the first port 101, oil passage 111 and check valve 113.

Since this discharge pressure has a value according to the difference in rotational speed between the front wheel output shaft 13 side and the rear wheel output shaft 19 side, coupling force for urging the pressure plates 75 and the clutch plates 73 with each other by the piston 65 also depends on such difference in rotational speed. Consequently, the magnitude of the torque transmitted by the clutch mechanism 53 also varies according or corresponding to the above difference in rotational speed.

Thus, upon occurrence of a difference in rotational speed, the clutch mechanism 53 operates at a degree of coupling according to the difference in rotational speed, so that the rotational speed difference is suppressed, thus permitting transmission of torque also to the rear wheel output shaft 19 side. Consequently, in the event the front wheels 5 and 6 slip, the driving condition switches to four-wheel driving condition automatically to rotate the rear wheels 17 and 18. If the above difference in rotational speed exceeds a certain value, the increase of the discharge pressure is suppressed by the action of the relief valve 123 and the torque transmitted to the rear wheel output shaft 19 side is held at a certain value to ensure safety.

Conversely, when the rear wheels 17 and 18 rotate faster than the front wheels 5 and 6, for example, when the front wheels are braked and tend to be locked, the inner gear 59 rotates in the direction of arrow "b" automatically relative to the outer gear 61. At this time, the oil supply passage switches automatically, whereby oil is sucked into the first port 101 through the oil suction port 81, oil passage 109, check valve 107 and oil passage 105 and then discharged from the oil passage 116 into the oil chamber 71 through the second port 103, oil passage 112 and check valve 114. Since this discharge pressure is also set according to the difference in rotational speed between the front wheel output shaft 13 side and the rear wheel output shaft 19 side, the coupling force for urging the pressure plates 75 and clutch plates 73 with each other by the piston 65 is determined according to the above difference in rotational speed. Consequently, the magnitude of torque transmitted by the clutch mechanism 53 also varies according to such difference in rotational speed.

Also in this case, the clutch mechanism 53 operates at a degree of coupling proportional to the difference in rotational speed, so that the rotational speed difference is suppressed and the torque is transmitted also to the front wheel output shaft 13 side. Consequently, the driving condition becomes a four-wheel driving condition automatically because the front and rear wheel output shafts 13 and 19 are coupled with each other by the clutch mechanism 53, whereby the rotation of the rear wheels 17 and 18 is suppressed and the front wheels 5 and 6 are rotated. Also in this case, if the above difference in rotational speed exceeds a certain value, the increase of the discharge pressure is suppressed by the action of the relief valve 123 and the torque transmitted to the front wheel output shaft 13 side is held at a certain value to ensure safety.

Thus, the amount of torque transmitted to the rear wheel output shaft 19 side is controlled automatically to enable the vehicle to undergo the four-wheel driving by the clutch mechanism 53 according to the difference in rotational speed between the front wheel output shaft 13 side and the rear wheel output shaft 19 side. Therefore, where the rotational speed of the front wheels 5 and 6 is very high as compared with that of the rear wheels 17 and 18, the former decreases and at the same time the latter increases to thereby reduce the difference in rotational speed. Consequently, in the event of slip of the front wheels 5 and 6, this slip is reduced and at the same time the driving torque transmitted to the rear wheels 17 and 18 is increased to prevent the vehicle from becoming incapable of running. Moreover, when the rear wheels 17 and 18 are braked and tend to be locked, the driving torque to the rear wheels is increased to prevent locking of the rear wheels.

On the other hand, where the rotational speed of the rear wheels 17 and 18 is very high as compared with that of the front wheels 5 and 6, for example, when the front wheels 5 and 6 are braked and tend to be locked, the driving torque to the front wheels 5 and 6 is increased to prevent locking of the front wheels.

During normal turning operation of the vehicle, the rotational speed of the front wheels 5 and 6 is slightly higher than that of the rear wheels 17 and 18, a braking torque acts on the front wheels 5 and 6, while a driving torque acts on the rear wheels 17 and 18, and turning is performed in the four-wheel driving condition. In such a case, a control is made by the relief valve 123 so that the discharge pressure of the oil pump 50 does not exceed a certain value, whereby the driving torque to be transmitted to the rear wheels 17 and 18 is automatically retained under a certain value so as to permit a difference in rotational speed between the front wheels 5, 6 and the rear wheels 17, 18 to some extent, so that turning of the vehicle is smoothly performed.

Further, by setting the rising characteristic and limit characteristic shown in FIG. 6 optionally in accordance with the throttling degree or capacity of the orifice 127 and opening or limiting characteristics of the relief valve 123, as constituent parts of the oil pressure control means 55, the torque to be transmitted can be set to a value suitable for a running condition, thus permitting a stable running.

Additionally, the piston 65 is normally urged against the pressure plates 75 by the annular spring 77, leaving no clearance between the clutch plates 73 and the pressure plates 75, therefore as soon as the oil pump 50 starts discharging the pressurized oil in response to a difference in rotational speed, the pressure plates 75 push the clutch plates 73 and oil pressure rises immediately, and thus a clutch torque or coupling force proportional to the rotational speed difference is obtained in an instant.

Moreover, as compared with the characteristic obtained according to a conventional system provided with no urging means as indicated by mark C in FIG. 6, a large initial torque B can be provided by the annular spring 77 and it can be set to a desired value by the same spring. Particularly, since the rising portion of the characteristic A shown in FIG. 6 is proportional to the square of a difference in rotational speed, with a very small rotational speed difference, the coupling force does not change so much, whereby the braking reduction, for example during turning at low speed, can be made small.

Further, a compact structure can be attained because there is used the clutch mechanism 53 of the type in which the pressure plates 75 and the clutch plates 73 are pushed by the piston 65 and a crescent-free rotor pump of a small radius is used as the oil pump 50. Besides, since the oil pump 50 is disposed within the inner peripheral portion of the clutch mechanism 53 so as to be disposed within the axial width of the clutch mechanism, it is possible to attain a compact structure. In other words, the oil pump 50 and the clutch mechanism 53 are arranged coaxially with respect to the rotational shafts 13 and 19 and in alignment in the radial direction of those rotational shafts, so it is possible to reduce the size in the radial direction.

In this system, the product of transfer torque due to the rotational speed difference causes an energy loss and generates heat; however, since some amount of oil is discharged toward the pressure plates 73 and clutch plates 75 of the clutch mechanism 53 through the oil passage 129, it is possible to effect cooling and lubrication of these pressure and clutch plates to a satisfactory extent.

Additionally, a crescent-free rotor pump of a small radius as shown in FIG. 3 is used as the oil pump 50 in this system. Among trochoid pumps, as compared with gerotor pump and trochocentric pump (internal gear with crescent), this rotor pump has the following characteristics with respect to its engaging portion 50a, addendum portion 50b and port portion 50c.

(I) At the engaging portion 50a:
1. The shut-in volume is so small that there is little leak and pulsation is small.
2. Radial force of the outer rotor is small because the pressure angle shown in FIG. 3 is small. Consequently, the bearing load of the outer rotor becomes smaller and hence the torque loss is decreased.
3. Since the amount of slip is small, the wear of the engaging surfaces is reduced and the friction loss is minimized.

When the slip speed becomes high, the teeth become disengaged.

(II) At the addendum seal portion 50b:
With two or three teeth, IN port 101 (103) and OUT port 103 (101) are sealed. The addendum clearance becomes smaller at a high pressure and therefore a high volumetric efficiency can be obtained.

(III) At IN and OUT port portion 50c:
Gear chambers are linked continuously without any teeth engaging portion. Therefore, it is easy to fill the suction portion with oil and there scarcely occurs caviation. Besides, since there is no contact of teeth, the oil pump is free from noise generation or tooth wear.

Even in comparison trochocentric pump (an internal gear pump with crescent), the following superior characteristics are attained.

(1) The absence of crescent contributes to the easiness of body processing and reduction of cost.

(2) The difference in the number of teeth between the pinion 59 and the internal gear 61 is small (e.g. 1), so the outside diameter of the internal gear 61 is reduced, resulting in that the mounting size and the torque loss are decreased.

(3) Since teeth are formed on the basis of a hypocycloid curve, it is possible to decrease slipping of the teeth and improve quietness.

(4) Since the amount of discharge per rotational shaft size is large, a smaller mounting size is sufficient to obtain the larger amount of discharge.

(5) The intermeshing ratio is close to unity and upon meshing of one tooth the meshing of other teeth is over, so the meshing noise and the tooth surface wear can be reduced.

Figure 7:
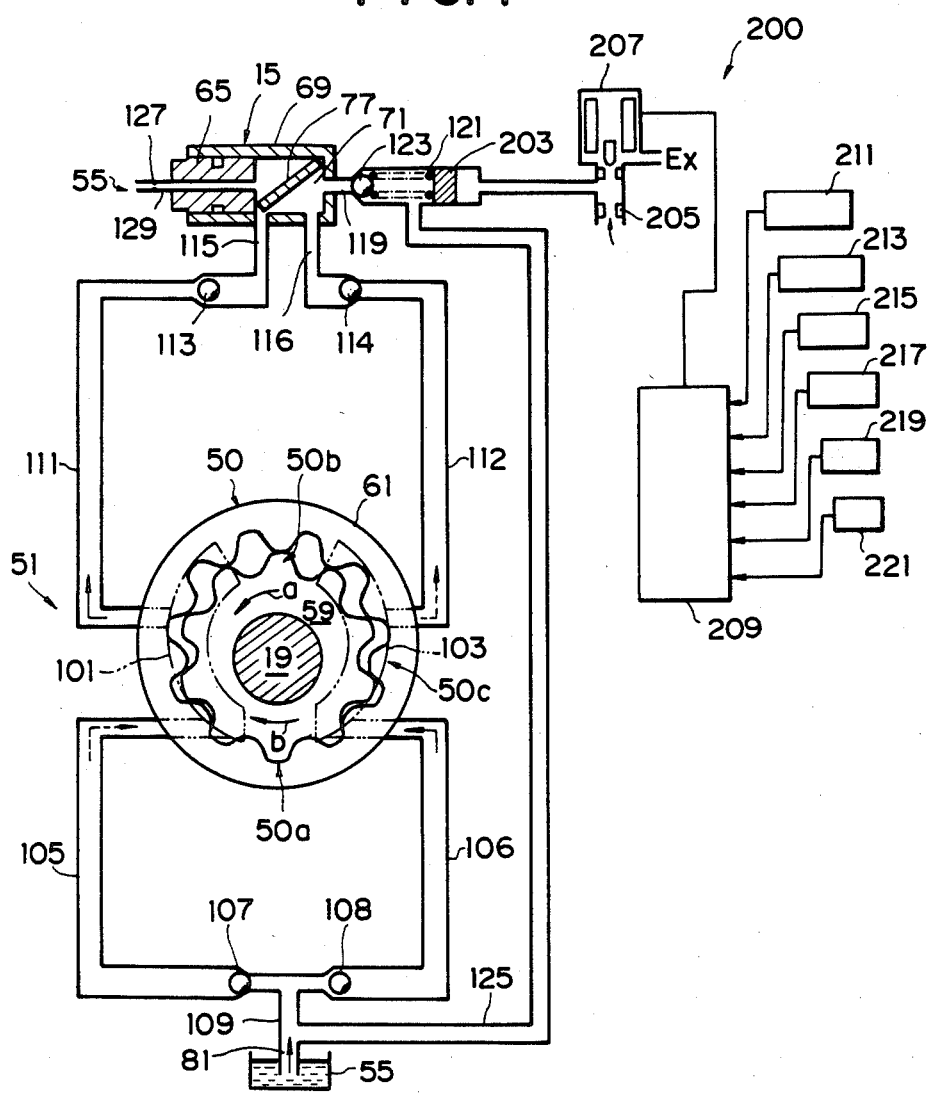
FIG. 7 is a hydraulic circuit diagram illustrating a second embodiment of the present invention.

Referring now to FIG. 7, which illustrates as a second embodiment a modification of the oil pressure control means 55 in the first embodiment.

In the second embodiment of FIG. 7, a relief valve device 200 is used in place of the relief valve 123 as a constituent of the oil pressure control means 55. This is the sole difference from the first embodiment. The same oil pump 50 and hydraulic circuit 51 as previously described are used. The relief valve device 200 is provided with a piston 203 at one end of the spring 121 which is in abutment at the other end with the relief valve 123, and an oil pressure for controlling the opening pressure of the relief valve 123 is applied to the relief valve 123 under duty control of the piston 203. A certain oil pressure for duty control is fed through an orifice 205, and is controlled by a solenoid valve 207. The solenoid valve 207 controls the oil pressure acting on the piston 203 in accordance with signals fed to a computer 209 such as a signal from an engine speed sensor 211, a signal from a front wheel output shaft revolution sensor 213, a signal from a rear wheel output shaft revolution sensor 215, a signal from a throttle opening sensor 217, a signal from a brake operation sensor 219 and a signal from a steering angle sensor 221.

The constant oil pressure supplied through the orifice 205 can be obtained by utilizing the controlling oil pressure in the case where the transmission 2 is an automatic transmission, by mounting an oil pump, by utilizing the oi pressure for power steering or for brake booster, or by utilizing the oil pressure obtained from the discharge side of the oil pump 50 in the case where the transmission 2 is a manual transmission.

According to the above structure, by detecting a higher load of the engine 1 from the throttle opening signal and by making control to increase the discharge pressure of the oil pump 50, it becomes possible to increase the amount of driving force transmitted to the rear wheels 17 and 18 in the four-wheel driving condition.

Further, by detecting an operating condition of the foot brake by means of a brake operation detecting switch and by making control to increase the discharge pressure of the oil pump 50 when the result of detection is ON, it is possible to prevent locking of the front wheels 5, 6 and rear wheels 17, 18, thereby to shorten the braking distance and to attain a stable braking condition.

Additionally, by detecting a steering angle and by making control to decrease the discharge pressure with increase of the steering angle, it is possible to avoid the occurrence of tight corner braking phenomenon and to thereby ensure a smooth turning.

Moreover, a stable running condition can be ensured by adjusting and controlling the discharge pressure of the oil pump 50 according to the engine speed and the vehicle speed on the basis of detected signals fed to the computer.

Figure 8:
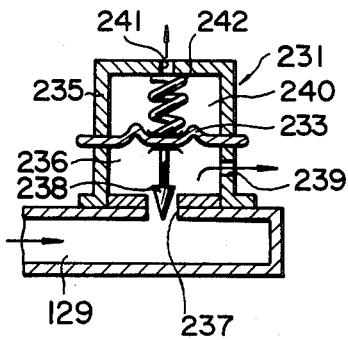
FIG. 8 is a longitudinal sectional view illustrating a third embodiment of the present invention.

Referring now to FIG. 8, there is illustrated as a third embodiment another modification of the oil pressure control means 55 used in the first embodiment. FIG. 8 shows an orifice device 231 which is provided in place of the orifice 127 as a constituent of the oil pressure control means 55. The same oil pump 50 and hydraulic circuit 51 as previously described are used.

The orifice device 231 is attached to the atmosphere-open oil passage 129 and it has a casing 235, which is divided by a diaphragm 233 to form two chambers. On chamber 236 has a communication hole 237 which communicates with the atmosphere-open oil passage 129, and also has an atmosphere hole 239 which communicates with the atmosphere. The communication hole 237 is opened and closed by a needle valve 238 attached to the diaphragm 235. On the other hand, the other chamber 240 in the casing 233 is provided with a manifold negative pressure transfer port 241 which communicates with the intake manifold portion of the engine 1 to receive the manifold negative pressure, and a spring 242 is mounted therein.

By using the orifice device 231 when, the manifold negative pressure is decreased with increase of the engine load, the orifice diameter of the communication hole 237 is made smaller, but the hole 237 is not closed fully but is held in a somewhat open condition. When the engine load thus becomes large, the driving force also increases, so the communication hole 237 is made small, thereby allowing the oil pressure of the oil pump 50 to rise promptly to bring about the four-wheel driving condition.

Further, with decrease of the engine load, the manifold negative pressure increases, the orifice diameter, namely, the passage area of the communication hole 237, becomes larger, and the oil pressure of the oil pump 50 rises more gently. Therefore the amount of slip between the front wheel output shaft 13 and the rear wheel output shaft 19 as well as the tolerance of the rotational speed difference between the front wheels 5, 6 and the rear wheels 17, 18 are made larger, whereby it is made possible to avoid the occurrence of tight corner braking phenomenon during turning and to ensure a smooth turning.

Figure 9:
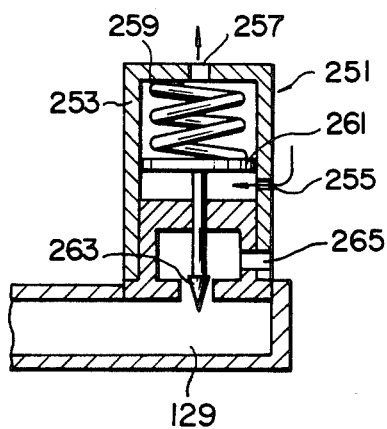
FIG. 9 is a longitudinal sectional view illustrating a fourth embodiment of the present invention.

A fourth embodiment using a different oil pressure control means will now be described with reference to FIG. 9, which shows an orifice device 251 provided in place of the orifice 127 constituting the oil pressure control means 55, and in the fourth embodiment, the same oil pump 50 and oil hydraulic circuit 51 as previously described are used.

The orifice device 251 has a casing 253 disposed in the atmosphere-open oil passage 129. The casing 253 is formed with a transfer port 255 to receive the oil pump discharge pressure for handle power steering, and a manifold negative pressure transfer port 257. Within the casing 253 is mounted a piston 261 through a spring 259 in a position between the manifold negative pressure transfer port 257 and the oil pump discharge pressure transfer port 255 so that the piston 261 can move reciprocally in response to the power steering oil pump discharge pressure and manifold negative pressure. Further, a needle valve 263 for opening and closing the atmosphere-open oil passage 129 is provided at the lower end of the piston 261, whereby the communication with the atmosphere side is controlled through an atmosphere hole 265.

By using the orifice device 251 of the above structure, when the power steering oil pressure is increased as the steering angle becomes larger, the needle valve 263 retreats to open the atmosphere-open oil passage 129 largely, thereby enlarging the tolerance of the difference in rotational speed between the front wheels 5, 6 and the rear wheels 17, 18. When such rotational speed difference becomes large in a straight running condition of the vehicle, the drive torque is transmitted to the rear wheels 17 and 18 to reduce such rotational speed difference.

Moreover, by introducing the manifold negative pressure into the transfer port 257 and controlling the opening/closing of the atmosphere-open oil passage 129 in accordance with the engine torque, it is made possible to effect switching to the four-wheel drive according to the magnitude of the engine torque and steering angle.

However, since there is a remarkable difference between the manifold negative pressure and the power steering oil pressure, it is necessary that the spring 259 should be a considerably strong spring.

The same purpose as th above can be attaind by using means for restricting the flow of oil variably according to operating conditions of the vehicle, such as by means of throttling the atmosphere-open oil passage 129 according to the magnitude of braking oil pressure or according to on-off operations of the accelerator. It is also possible to throttle the atmosphere-open oil passage 129 according to the running speed of the vehicle or steering angular speed.

Figure 10:
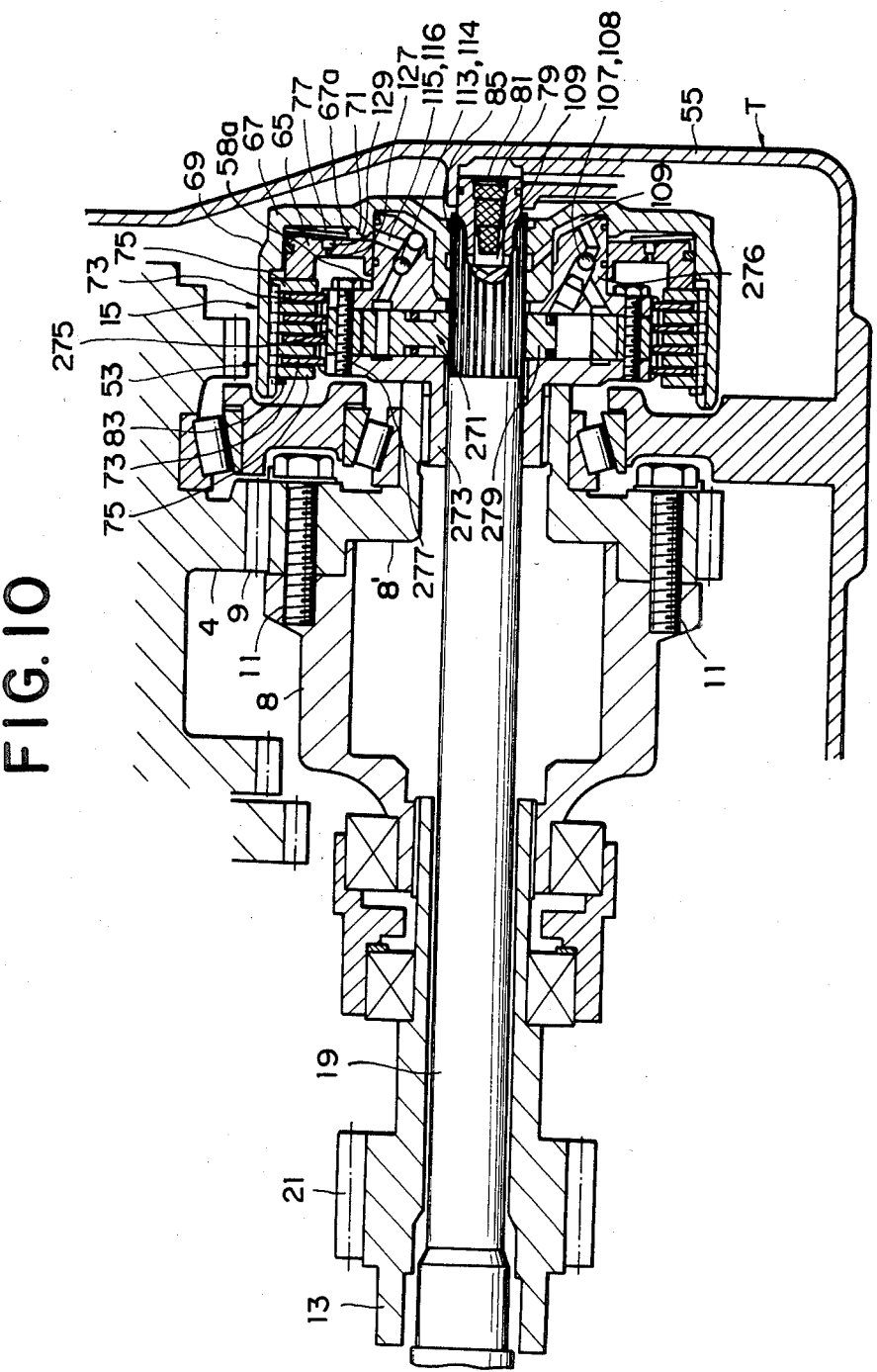
FIG. 10 is a longitudinal sectional view showing a principal portion of a fifth embodiment of the present invention.

A fifth embodiment using a vane pump as the oil pump 50 will be described below with reference to FIGS. 10, 11 and 12. The same parts as those already explained will be indicated by the same reference numerals and explanations therefor will be omitted.

The numeral 271 denotes a vane pump, and the pump body is composed of a pressure retainer 273, a cam ring 275 and a pump case 276, those which are coupled together by bolts 277. The pressure retainer 273 is splined to a sleeve shaft 8' connected to a front wheel driving shaft 13 for the transfer of driving force to the front wheels 5 and 6.

The vane pump 271 has a rotor 279 which is disposed in a space formed by the pressure retainer 273, cam ring 275 and pump case 276, and which is splined to a rear wheel output shaft 19. The rotor 279 is positioned eccentrically with respect to the cam ring 275, and on its outer peripheral portion are formed a certain number (nine in this embodiment) of vane grooves 281 at equal intervals along the circumferential direction. Each of the vane grooves 281 receives a vane 282 capable of coming into sliding contact with an inner peripheral surface 275a of the cam ring 275.

A plurality (four in this embodiment) of clutch plates 73 are splined to the outer peripheral portions of the pressure retainer 273, cam ring 275 and pump case 276, and a clutch mechanism 53 same as that described in the first embodiment is provided.

Figure 11:
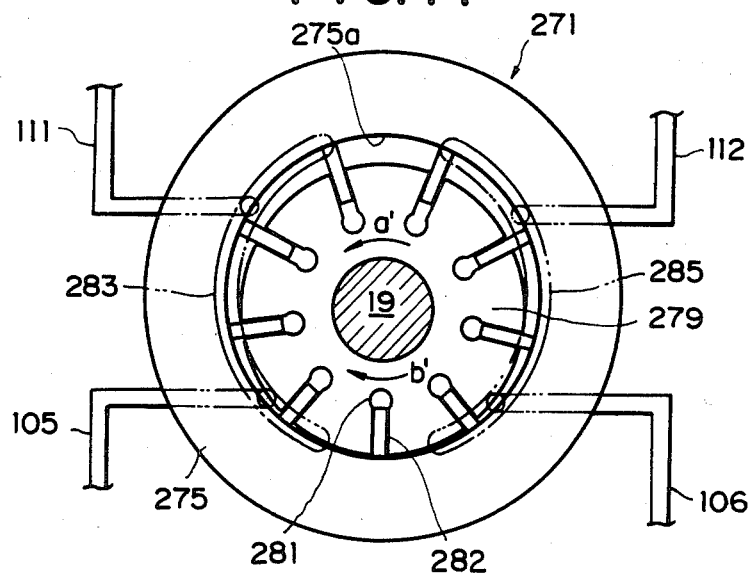
FIG. 11 is a schematic illustration showing a principal portion of an oil pump according to a fifth embodiment of the present invention.

Further, as shown in FIG. 11, the pump case 276 is formed with two ports 283 and 285, the port 283 communicating with oil passages 105 and 111 and the port 285 communicating with oil passages 106 and 112.

Figure 12:
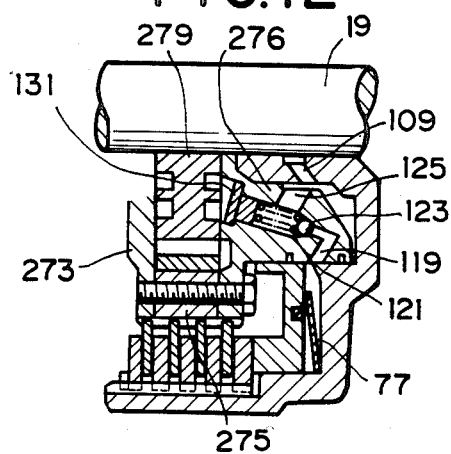
FIG. 12 is a longitudinal sectional view of a relief valve 123 used in the fifth embodiment and its vicinity.

FIG. 12 shows an oil passage 125 with a relief valve 123. In this embodiment, there are used the same hydraulic circuit 51 and oil pressure control means 55 as shown in FIG. 3 of the first embodiment.

In operation, when the rotor 279 rotates in the direction of arrow a' upon occurrence of a rotational speed difference between the front wheel output shaft 13 side and the rear wheel output shaft 19 side, oil is sucked into the port 285 through oil suction port 81, oil passage 109, check valve 108 and oil passage 106 and thereafter discharged from oil passage 115 through port 283, oil passage 111 and check valve 113.

Conversely, when the rotor 279 rotates in the direction of arrow b', oil is sucked into the port 283 through oil suction port 81, oil passage 109, check valve 107 and oil passage 105 and thereafter discharged from the oil passage 119 through port 285, oil passage 112 and check valve 114. The oi pressure thus discharged is lead to the oil chamber 71 and acts on the piston 65 to operate the clutch mechanism 53.

Thus, even if the vane pump 271 is used as the oil pump 50, the same function and effect as described above can be obtained. Other than the oil pump described above, another oil pump may be incorporated in the same manner.

Figure 13:
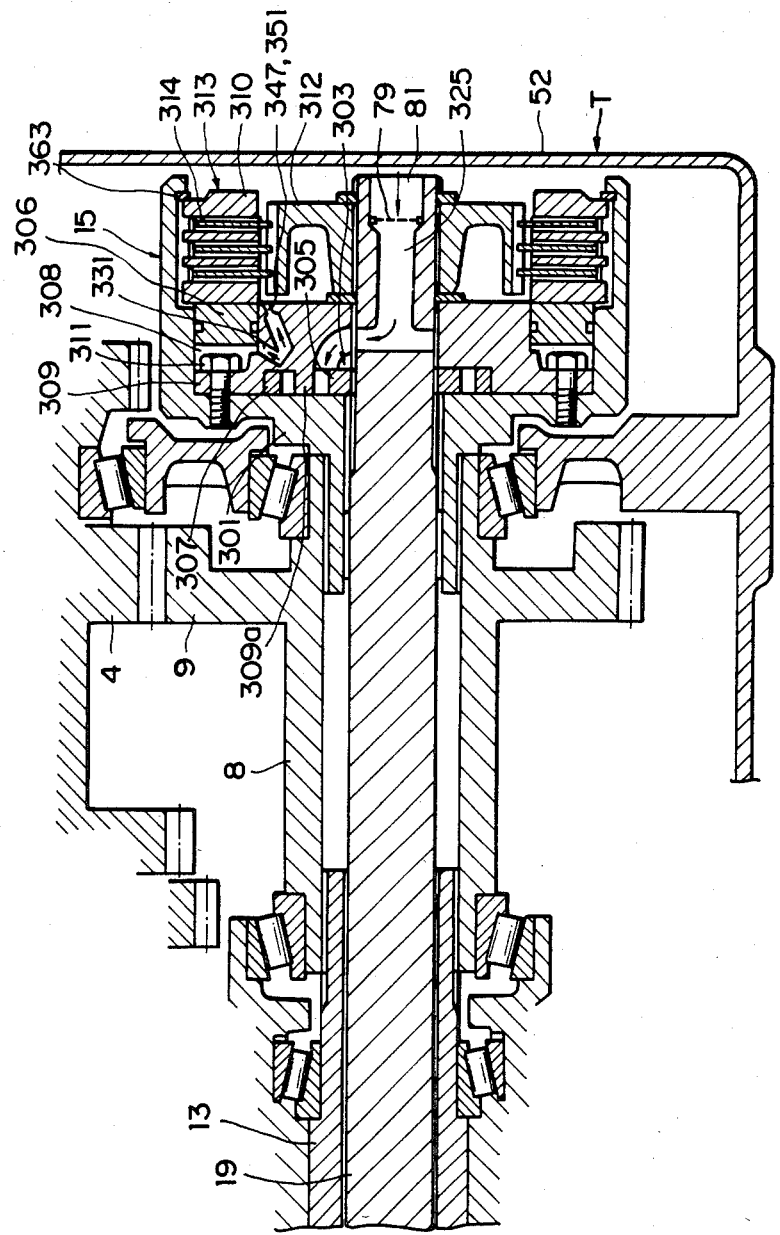
FIG. 13 is a longitudinal sectional view illustrating a sixth embodiment of the present invention.
Figure 14:
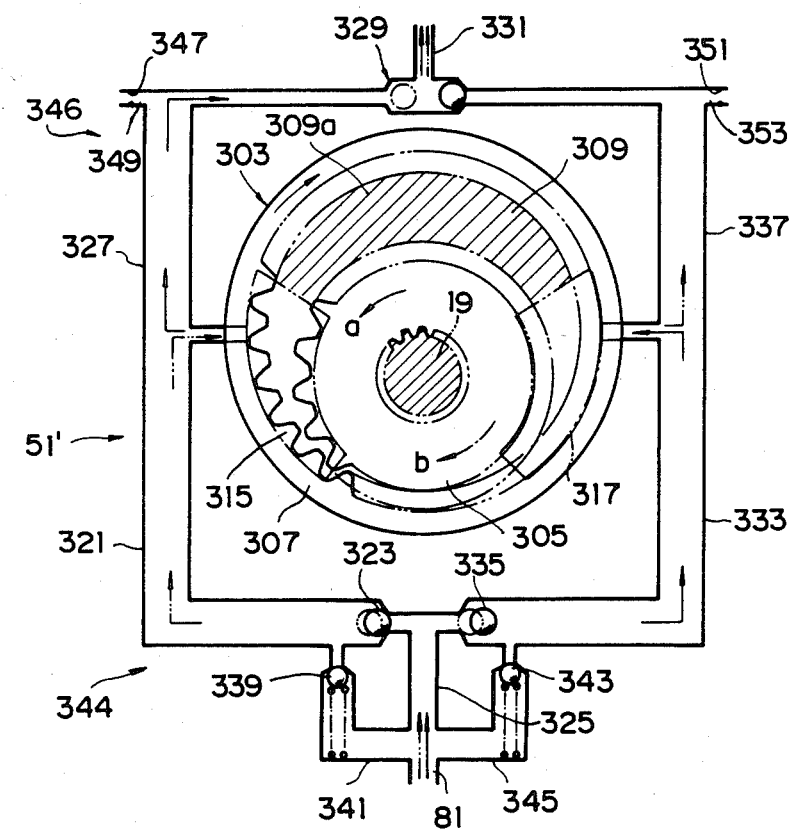
FIG. 14 is a hydraulic circuit diagram in the sixth embodiment.
Figure 15:
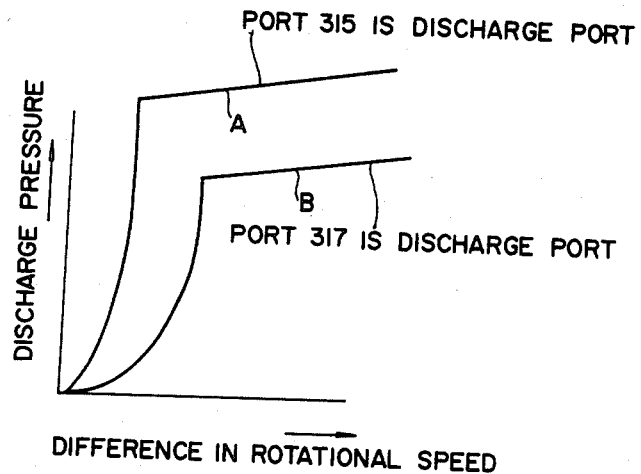
FIG. 15 is a graph illustrative of operation of the sixth embodiment.

Referring now to FIGS. 13, 14 and 15, there is illustrated as a sixth embodiment a modification of the hydraulic circuit 51, oil pressure control means 55 and oil pump 50 in the first embodiment. Parts equal to those used in the first embodiment will be indicated by the same reference numerals and explanations therefor will be omitted.

As shown in FIG. 13, a case 301 is splined to a sleeve shaft 8', and an oil pump 303 is mounted in the case 301. The oil pump 303 has an inner gear 305 as an external gear splined to a rear wheel output shaft 19, and an outer gear 307 as an internal gear which is in mesh with the inner gear 305 but which is disposed in a position eccentric with respect to the inner gear 305. The inner gear 305 and the outer gear 307 are mounted within a pump case 309. The pump case 309 is fixed to the case 301 by bolts 311, and a part 309a of the pump case 309 is positioned in a gap between the inner gear 305 and the outer gear 307.

On the outer periphery of the pump case 309 is formed an annular stepped portion in which is fitted a piston 306 as shown in FIG. 13, whereby an oil chamber 308 is formed between the piston 306 and the pump case 309.

Further, a clutch mechanism 313 has a plurality of pressure plates 310 splined to the inner peripheral side portion of the case 301 and a plurality of clutch plates 314 splined to a sleeve 312 with rear wheel output shaft 19, the pressure plates 310 and the clutch plates 314 being arranged alternately with each other.

A hydraulic circuit 51' will now be described.

As shown in FIG. 14, the oil pump or pump means 303 is formed with two ports 315 and 317. The port 315 provides the fluid pressure when the front wheel output shaft 13 rotates faster than the rear wheel output shaft 19, and the port 317 provides the fluid pressure when the front wheel output shaft 13 rotates slower than the rear wheel output shaft 19 in the same manner as in the first embodiment. One port or a first port 315 communicates with an oil suction port 81 which is provide in an end of the rear wheel output shaft 19, through an oil passage 321 as a first oil passage, a check valve 323 as a first suction check valve and a suction oil passage 325, and also the first port 315 communicates with a discharge oil passage 331 through an oil passage 327 as a third oil passage and a three-way change-over check valve 329. The other port or a second port 317 communicates with the oil suction port 81 through an oil passage 333 as a second oil passage, a check valve 335 as a second suction check valve and a suction oil passage 325, and also the second port 317 communicates with the discharge oil passage 331 through an oil passage 337 as a fourth oil passage and the three-way change-over check valve 329 as first and second discharge check valves.

Between the oil passages 325 and 321 is disposed an oil passage 341 with a relief valve 339 as a first relief valve having a large limit pressure value while between the oil passages 325 and 333 is disposed an oil passage 345 with a relief valve 343 as a second relief valve having a small limit pressure value. The oil passages 321, 333 and 325 constitute a suction hydraulic circuit 344, while the oil passages 327, 331 and 337 constitute a discharge hydraulic circuit 346.

From the oil passage 327 there branches an atmosphere-open oil passage 349 with an orifice 347 as a first orifice having a large throttling capacity while a branch from the oil passage 337 is an atmosphere-open oil passage 353 with an orifice 351 as a second orifice having a small throttling capacity.

The orifice 347 and the relief valve 339 as well as the orifice 351 and the relief valve 343 constitute an oil or fluid pressure control means 360.

The reference numeral 363 in FIG. 13 denotes a stopper member.

The oil passages 349 and 353 are lead to the pressure plates 310 and clutch plates 314 of the clutch mechanism 313, and oil pressure is discharged toward the pressure plates 310 and clutch plates 314. The ports 315, 317, oil passages 311, 325, 327, 331, 337, 333, 349, 353, check valves 323, 335, relief valves 339, 343, orifices 347, 351 and three-way change-over type check valve 329 are disposed within the pump case 309.

FIG. 15 shows a discharge or fluid pressure characteristic A discharge from the oil passage 331 through the first port 315 when the inner gear 305 rotates relative to the outer gear 307 in the direction of arrow "a" in FIG. 14 when the front wheel output shaft 13 rotates faster then the rear wheel output shaft 19, as well as a discharge pressure characteristic B discharged from the oil passage 331 through the second port 317 when the inner gear 305 rotates relative to the outer gear 307 in the direction of arrow "b" when the front wheel output shaft 13 rotates slower than the rear wheel output shaft 19.

With the above construction, there are attained operations and effects same as those described in connection with the first embodiment. Furthermore, in the sixth embodiment, the variable fluid pressure characteristic A has a wide range of fluid pressures due to the first relief valve 339 and has a large rising rate due to the first orifice 347, while the fluid pressure characteristic B has a small range of fluid pressures due to the second relief valve 343 and has a small rising rate due to the second orifice 351. Namely the fluid pressure control means 360 comprised of the first and second relief valves 339, 343 and the first and second orifices 347, 351 modulates the fluid pressure produced by the oil pump 50 according to the rotational direction of one drive shaft relative to the other drive shaft. The oil pressure control means 360 in this sixth embodiment may be controlled in the same way as in the second, third and fourth embodiments.

The position of the power transmission system 15 is not limited to the position shown in FIG. 1. There may be adopted such a modification as shown in FIG. 16 which is schematic construction diagram of a driving system according to a seventh embodiment of the present invention.

Figure 16:
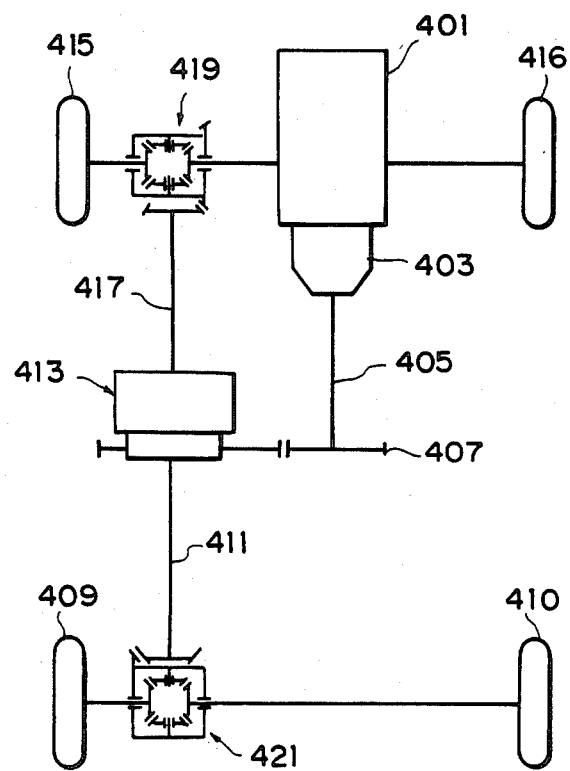
FIG. 16 is a schematic construction diagram of a drive system according to a seventh embodiment of the present invention.

In FIG. 16, a transmission 403 is connected to a longitudinally disposed engine 401, and a drive gear 407 mounted on its output shaft 405. A rear wheel driving shaft 411 for transferring the driving force to rear wheels 409 and 410 is driven directly from the drive gear 407. At the same time, the driving force thus transmitted from the drive gear 407 is transmitted through a power transmission system 413 to a front wheel driving shaft 417 which transfers the driving force to front wheels 415 and 416. The numerals 419 and 421 denote differential gears for front and rear wheels, respectively.

According to the above schematic construction of the vehicular drive system, in the event of sudden acceleration, the rear wheel load increases, so the grip limit torque of the rear wheels 409 and 410 becomes larger and the greater part of the engine torque is consumed by the rear wheels 409 and 410. Therefore, it is sufficient to transmit an engine torque corresponding to an amount exceeding the grip limit of the rear wheels, to the front wheels 415 and 416 through the power transmission system 413, and thus the torque capacity to be transmitted to the front wheels can be reduced, thereby permitting reduction of the pump capacity and the capacity of the clutch mechanism. Further, since the engine torque can be applied directly to the rear wheel side where the grip limit torque becomes larger, the acceleration performance is improved.

What is claimed is:

1. A power transmission system for a vehicle having an engine, a first rotational shaft which transmits a driving force to the vehicle front wheels, and a second rotational shaft which transmits a driving force to the vehicle rear wheels, the power transmission system comprising: a transmission directly connected to one of the first and second rotational shafts but not directly to the other for transmitting the driving force produced by the engine to the one rotational shaft; an oil pump cooperatively driven by the first and second rotational shafts to provide a variable discharge pressure proportional to the rotational speed difference between the first and second rotational shafts; a clutch mechanism for coupling the first and second rotational shafts with each other with a variable coupling force corresponding to the magnitude of the discharge pressure fed from the oil pump so as to distribute the driving force from the one rotational shaft directly connected to the transmission to the other rotational shaft; a hydraulic circuit for feeding hydraulic fluid to the oil pump and for supplying the discharge pressure from the oil pump to the clutch mechanism; and oil pressure control means provided in the hydraulic circuit for modulating the magnitude of the discharge pressure of the hydraulic fluid flowing through the hydraulic circuit in accordance with the relative rotational direction of the first and second rotational shafts.

2. A power transmission system according to claim 1, wherein the oil pressure control means includes orifice means having different throttling capacities for automatically determining a rising rate of the discharge pressure applied to the clutch mechanism.

3. A power transmission system according to claim 1; wherein the oil pressure control means includes relief valve means having different limit pressure values for limiting the magnitude of the discharge pressure applied to the clutch mechanism within the limit pressure values.

4. A power transmission system according to claim 1; wherein the oil pump has a pair of communicating ports, one port providing the discharge pressure when the first rotational shaft rotates faster than the second rotational shaft, and the other port providing the discharge pressure when the first rotational shaft rotates slower than the second rotational shaft; the hydraulic circuit has an oil sump for storing the hydraulic fluid, first and second suction check valves, the first and second discharge check valves, the hydraulic circuit comprising a first oil passage which provides communication between the one port of the oil pump and the oil sump through the first suction check valve, a second oil passage which provides communication between the other port of the oil pump and the oil sump through the second suction check valve, a third oil passage which provides communication between the one port of the oil pump and the clutch mechanism through the first discharge check valve, and a fourth oil passage which provides communication between the other port of the oil pump and the clutch mechanism through the second discharge check valve; and the oil pressure control means comprises a first relief valve disposed in the hydraulic circuit between the first suction check valve and the first discharge check valve for limiting the discharge pressure provided from the one port, a first orifice communicating with the third oil passage for determining a rising rate of the discharge pressure provided from the one port, a second relief valve disposed in the hydraulic circuit between the second suction check valve and the second discharge check valve for limiting the discharge pressure provided from the other port, and a second orifice communicating with the fourth oil passage for determining a rising rate of the discharge pressure provided from the other port.

5. A power transmission system according to claim 4; wherein the first relief valve has a relatively high limit pressure value and operates when the first rotational shaft rotates faster than the second rotational shaft to provide a wide range of discharge pressures, and the second relief valve has a relatively low limit pressure value and operates when the first rotational shaft rotates slower than the second rotational shaft to provide a small range of discharge pressures.

6. A power transmission system according to claim 4; wherein the first orifice has a relatively large throttling capcacity and operates when the first rotational shaft rotates faster than the second rotational shaft to provide a discharge pressure having a large rising rate, and the second orifice has a relatively small throttling capacity and operates when the first rotational shaft rotates slower than the second rotational shaft to provide a discharge pressure having a small rising rate.

7. A power transmission system according to claim 4; wherein the first relief valve has a relatively high limit pressure value and the first orifice has a relatively large throttling capacity so that when the first rotational shaft rotates faster than the second rotational shaft the first relief valve cooperates with the first orifice to provide a discharge pressure having a wide range and a large rising rate, and the second relief valve has a relatively low limit pressure value and the second orifice has a relatively small throttling capacity so that when the first rotational shaft rotates slower than the second rotational shaft the second relief valve cooperates with the second orifice to provide a discharge pressure having a small range and a small rising rate.

8. A power transmission system for a four-wheel drive vehicle having an engine and a pair of drive shafts, comprising: a transmission connected during use of the power transmission system between an engine and one of a pair of drive shafts for transmitting a drive torque produced by the engine directly to the one drive shaft but not directly to the other of the pair of drive shafts; pump means cooperatively driven by the pair of drive shafts for producing a variable fluid pressure proportional to the rotational speed difference between the pair of drive shafts; clutch means connected to the pump means and disposed between the pair of drive shafts for frictionally coupling the pair of drive shafts with each other by a variable coupling force corresponding to the magnitude of the fluid pressure applied thereto so as to temporarily distribute the drive torque from the one drive shaft directly connected to the transmission to the other drive shaft, thereby enabling the vehicle to undergo fourwheel drive by both of the drive shafts when a substantial rotational speed difference exists therebetween, while enabling the vehicle to undergo two-wheel drive by the one drive shaft directly connected to the transmission when no substantial rotational speed difference exists between the pair of drive shafts; a hydraulic circuit for supplying hydraulic fluid to the pump means and for transmitting the fluid pressure produced by the pump means to the clutch means; and fluid pressure control means disposed in the hydraulic circuit for modulating the fluid pressure of the hydraulic fluid flowing through the hydraulic circuit according to the rotational direction of one drive shaft relative to the other drive shaft so that the clutch means produces different coupling forces in response to whether the one drive shaft rotates faster or slower than the other drive shaft.

9. A power transmission system according to claim 8; wherein the pair of drive shafts comprises a front drive shaft and a rear drive shaft.

10. A power transmission system according to claim 9; wherein the pump means has first and second communicating ports, the first communicating port providing the fluid pressure when the front drive shaft rotates faster than the rear drive shaft, and the second communicating port providing the fluid pressure when the front drive shaft rotates slower than the rear drive shaft.

11. A power transmission system according to claim 10; wherein the hydraulic circuit includes first and second separate fluid passage means, the first fluid passage means supplying the fluid pressure from the first communicating port to the clutch means, and the second fluid passage means supplying the fluid pressure from the second communicating port to the clutch means.

12. A power transmission system according to claim 11; wherein the fluid pressure control means includes a first relief valve having a relatively large limit pressure value and disposed in the first fluid passage means for providing a wide range of fluid pressures when the front drive shaft rotates faster than the rear drive shaft, and a second relief valve having a relatively small limit pressure value and disposed in the second passage means for providing a small range of fluid pressures when the front drive shaft rotates slower than the rear drive shaft.

13. A power transmission system according to claim 11; wherein the hydraulic circuit includes a fluid sump for supplying the fluid to the pump means.

14. A power transmission system according to claim 13; wherein the first fluid passage means comprises a first passage connected between the fluid sump and the first communicating port, a third passage connected between the clutch means and the first communicating port, a first suction check valve disposed in the first passage, and a first discharge check valve disposed in the third passage, and the second fluid passage means comprises a second passage connected between the fluid sump and the second communicating port, a fourth passage connected between the clutch means and the second communicating port, a second suction check valve disposed in the second passage, and a second discharge check valve disposed in the fourth passage.

15. A power transmission system according to claim 8; wherein the clutch means comprises a multiple disc clutch.

16. A power transmission system according to claim 8; wherein the pump means comprises a gear type pump.

17. A power transmission system according to claim 8; wherein one drive shaft has a hollow cylindrical shape and is coaxially disposed around the other drive shaft.

18. A power transmission system according to claim 17; including a housing disposed at the end portions of the drive shafts for mounting the clutch means and a pump means.

19. A power transmission system according to claim 18; wherein the pump means is disposed between the pair of drive shafts.

20. A power transmission system according to claim 19; wherein the clutch means is coaxially disposed around the outer peripheral portion of the pump means.

21. A power transmission system according to claim 8; wherein the fluid pressure control means includes relief means disposed in the hydraulic circuit for limiting the fluid pressure flowing through the hydraulic circuit in response to whether or not the one drive shaft rotates faster than the other drive shaft.

22. A power transmission system according to claim 8; wherein the fluid pressure control means includes orifice means disposed in the hydraulic circuit for controlling the rising rate of the fluid pressure flowing through the hydraulic circuit in response to whether or not the one drive shaft rotates faster than the other drive shaft.

23. A power transmission system according to claim 22; wherein the fluid pressure control means futher includes means for controlling the throttling action of the orifice means in response to a manifold negative pressure of the engine.

24. A power transmission system according to claim 22; wherein the fluid pressure control means further includes means for controlling the throttling action of the orifice means in response to a discharge pressure from a power steering oil pump of the vehicle.

* * * * *